United States Patent
Mishra et al.

(10) Patent No.: US 11,867,113 B2
(45) Date of Patent: Jan. 9, 2024

(54) GENERATOR SET-ENGINE LOAD MANAGEMENT TECHNIQUES

(71) Applicant: Caterpillar Inc., Peoria, IL (US)

(72) Inventors: Abhishek K Mishra, Karnataka (IN); Rajaram Namachivayam, Bangalore (IN); Paul W Fraysure, III, Zebulon, GA (US); Gareth Osborne, Belfast (GB); William R English, Rutland (GB); Christopher J Worrall, Peterborough (GB)

(73) Assignee: Caterpillar Inc., Peoria, IL (US)

( * ) Notice: Subject to any disclaimer, the term of this patent is extended or adjusted under 35 U.S.C. 154(b) by 78 days.

(21) Appl. No.: 17/557,527

(22) Filed: Dec. 21, 2021

(65) Prior Publication Data

US 2023/0193808 A1   Jun. 22, 2023

(51) Int. Cl.
| | | |
|---|---|---|
| *F01P 7/16* | (2006.01) | |
| *F02D 29/06* | (2006.01) | |
| *F01P 3/18* | (2006.01) | |
| *H02P 9/10* | (2006.01) | |

(52) U.S. Cl.
CPC .............. *F01P 7/167* (2013.01); *F01P 3/18* (2013.01); *F02D 29/06* (2013.01); *H02P 9/105* (2013.01); *F01P 2025/60* (2013.01); *F01P 2037/00* (2013.01); *F01P 2060/18* (2013.01); *F01P 2070/04* (2013.01)

(58) Field of Classification Search
CPC ... F01P 3/18; F01P 7/167; F02D 29/06; H02P 9/10
See application file for complete search history.

(56) References Cited

U.S. PATENT DOCUMENTS

| | | | |
|---|---|---|---|
| 8,912,672 B2 | 12/2014 | Pendray et al. | |
| 9,444,304 B2 | 9/2016 | Fraysure, III et al. | |
| 9,584,055 B2 | 2/2017 | Cooper et al. | |
| 2010/0154729 A1* | 6/2010 | Ktami | F01P 7/165 |
| | | | 123/41.1 |
| 2014/0150408 A1 | 6/2014 | Van Niekerk et al. | |
| 2014/0277791 A1 | 9/2014 | Lenard et al. | |
| 2016/0014846 A1 | 1/2016 | Grunow et al. | |
| 2017/0036666 A1 | 2/2017 | Severinsky et al. | |
| 2018/0142630 A1 | 5/2018 | Boggs | |
| 2020/0271083 A1 | 8/2020 | Kennedy et al. | |

* cited by examiner

*Primary Examiner* — Kevin A Lathers
(74) *Attorney, Agent, or Firm* — Schwegman Lundberg & Woessner, P.A.

(57) ABSTRACT

A generator set configured to provide an electrical output to an external electrical load. The generator set includes an engine configured to drive an electric generator, the engine including an engine block, where the electric generator is configured to couple to the external electrical load. The generator set includes a heating system in fluid communication with the engine block, the heating system including an electric fluid heater, where the electric jacket fluid includes a resistive load configured to supplement the external electrical load. The generator set includes a control system for: monitoring a first parameter of the engine; generating a first control signal in response to the first parameter being less than a first threshold; and increasing the external electrical load by turning on the electric fluid heater in response to the first control signal.

20 Claims, 6 Drawing Sheets

US 11,867,113 B2

GENERATOR SET-ENGINE LOAD MANAGEMENT TECHNIQUES

TECHNICAL FIELD

This document relates to engine-generator power systems and in particular to techniques for managing load conditions of engine-generator power systems.

BACKGROUND

An engine-generator or a generator set ("genset") can be a combination of an engine and a generator. Both components can be mounted together to form a single machine. A generator set can provide electricity at various locations such as construction sites or emergency response sites. A generator set can be a small person-portable device or a larger device that can be mounted on a skid or a trailer, depending on the requirements and location, and the amount of power that is needed for a particular use.

Generator sets can be used as a backup power source or a primary power source. If power from a primary power source is no longer available the generator set can be used for backup power. The generator set can be shutdown when the primary source is made available again. The generator set can also be used as a primary power source.

Generator set engines are designed to be operated under loaded conditions. If the generator set engine is not operated with sufficient mechanical load, then some of its components can be adversely affected. Operating the generator set for an extended time in a no load or a low load condition can result in either wet stacking of the engine or higher than expected oil consumption, for example.

US20180142630 describes a system and a method where a load bank of multiple load resistors is electrically connected to an engine-generator set and the resistive load bank is cooled by diesel engine exhaust (the diesel engine driving a generator) thereby maintaining a minimum generator load for optimal operation of the diesel engine-generator set (achieved by the load bank converting "surplus" electrical energy to heat which heat is dissipated by the cooler engine exhaust gas).

SUMMARY OF THE INVENTION

By using various techniques of this disclosure, a generator set can automatically add an auxiliary or supplemental electrical load during no load, low load, or low ambient temperature conditions to improve the engine efficiency and thermal management capability of after treatment components, such as a DPF. A control system can monitor one or more parameters of an engine and, in response to a parameter exceeding a threshold, turn on a jacket water heater in fluid combination with the engine in order to supplement the electrical load.

In some aspects, this disclosure is directed to a generator set configured to provide an electrical output to an external electrical load, the generator set comprising: an engine configured to drive an electric generator, the engine including an engine block, wherein the electric generator is configured to couple to the external electrical load; a heating system in fluid communication with the engine block, the heating system including an electric jacket fluid heater, wherein the electric jacket fluid includes a resistive load configured to supplement the external electrical load; and a control system for: monitoring a first parameter of the engine; generating a first control signal in response to the first parameter being less than a first threshold; and increasing the external electrical load by turning on the electric fluid heater in response to the first control signal.

In some aspects, this disclosure is directed to a method of operating a generator set to provide an electrical output to an external electrical load, the method comprising: monitoring a first parameter of an engine that is configured to drive an electric generator, wherein the engine includes an engine block, and wherein the electric generator is configured to couple to the external electrical load; generating a first control signal in response to the first parameter being less than a first threshold; and increasing the external electrical load by turning on an electric fluid heater of a heating system in response to the first control signal, the heating system in fluid communication with the engine block, wherein the electric fluid heater includes a resistive load configured to supplement the external electrical load.

In some aspects, this disclosure is directed to a generator set configured to provide an electrical output to an external electrical load, the generator set comprising: an engine configured to drive an electric generator, the engine including an engine block, wherein the electric generator is configured to couple to the external electrical load; a heating system in fluid communication with the engine block, the heating system including an electric jacket water heater disposed within the engine block, wherein the electric jacket water heater includes a resistive load configured to supplement the external electrical load; and a control system for: monitoring a first parameter of the engine; generating a first control signal in response to the first parameter being less than a first threshold; increasing the external electrical load by turning on the electric heater in response to the first control signal; monitoring a second parameter of the engine; generating a second control signal in response to the second parameter exceeding a second threshold; and turning off the electric jacket water heater in response to the second control signal.

DETAILED DESCRIPTION

Examples according to this disclosure are directed to methods and systems for managing no load or low load conditions and/or low ambient temperature conditions of a generator set. As explained previously herein, generator set engines are designed to be operated under loaded conditions. If the generator set engine is not operated with sufficient mechanical load, then some of its components can be adversely affected. Operating the generator set for an extended time in a no load or a low load condition can result in either wet stacking of the engine or higher than expected oil consumption, for example. Further, if the generator set engine is equipped with emissions aftertreatment system, various components can lose efficiency or malfunction.

Figure 1:
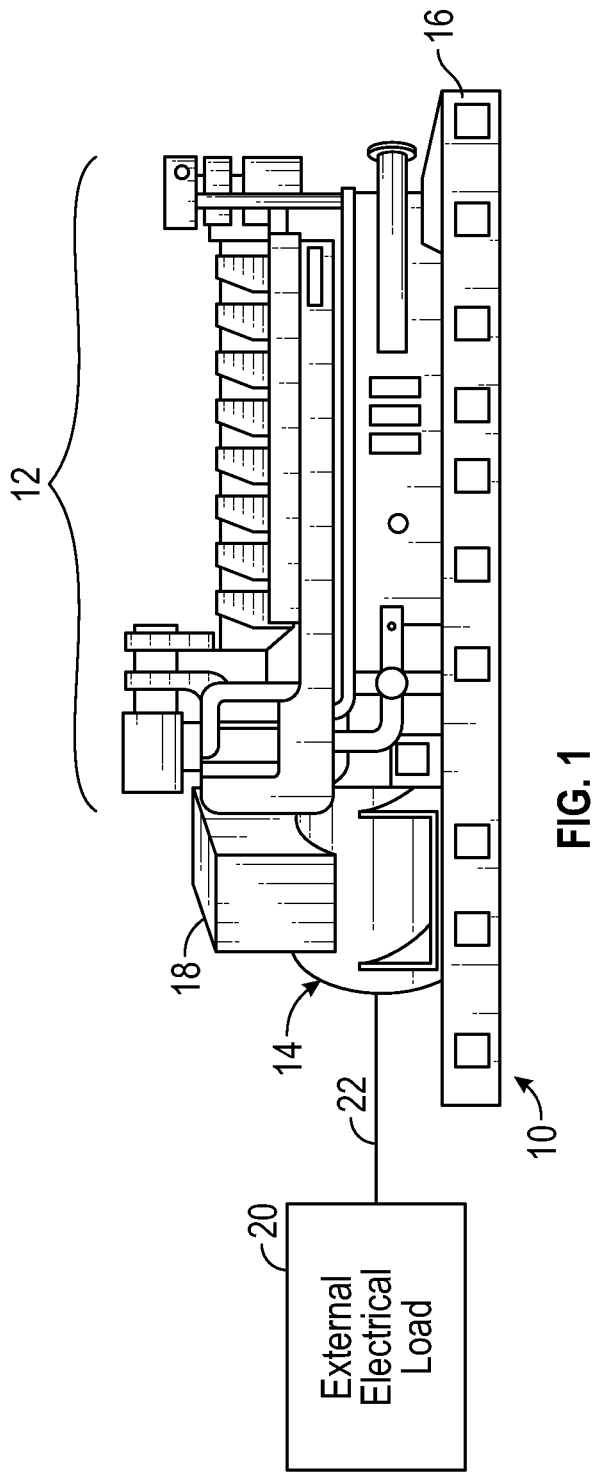
FIG. 1 illustrates an example of a generator set having a prime mover coupled to and configured to mechanically rotate or drive an electric generator.

FIG. 1 illustrates an example of a generator set (genset) 10 having a prime mover 12 coupled to and configured to mechanically rotate or drive an electric generator 14. The prime mover 12 can be a heat engine, such as a combustion engine, that combusts a mixture of fuel and air to produce the mechanical rotation. The prime mover 12 can be any type of combustion engine such as, for example, a diesel engine, a gasoline engine, or a gaseous fuel-powered engine.

The electric generator 14 can be, for example, an AC induction generator, a permanent-magnet generator, an AC synchronous generator, or a switched-reluctance generator. The electric generator 14 can be configured to couple to the external electrical load.

In some examples, the electric generator 14 can include multiple pairings of poles (not shown), with each pairing having three phases arranged on a circumference of a stator (not shown) to produce an alternating current with a frequency of 50 and/or 60 Hz. Electrical power produced by the electric generator 14 can be directed for offboard purposes by way of one or more generator bus bars (not shown). The prime mover 12 and the electric generator 14 can each be rigidly mounted to an anchor platform or rails 16 (only one shown in FIG. 1).

The generator set 10 can also include a terminal box 18 mounted to generator 14 and in communication with prime mover 12 and/or generator 14 to monitor and regulate an electrical output of the generator set 10. The generator set 10 is configured to provide an electrical output to an external electrical load 20, such as by using an electrical bus 22.

As mentioned above, in some examples, the prime mover 12 can be a diesel engine. In some such examples, the diesel engine can include a diesel particulate filter (DPF) (or other aftertreatment device(s)) that can help remove particulate or soot from the exhaust of the diesel engine. Over time, the DPF (or other aftertreatment device(s)) can become clogged.

If the generator set engine is equipped with emissions aftertreatment system, various components can lose efficiency or malfunction. For example, DPF regeneration is an example of an emissions aftertreatment process in which the material that has built up in the DPF (or other aftertreatment device(s)) can be burned off by way of elevated temperatures. In other words, when the DPF (or other aftertreatment device(s)) becomes clogged, the engine can be run at a higher temperature to burn off the soot and any other accumulated particles. However, if the generator set is operated for an extended time during no load or low load conditions, the engine may not reach a sufficient temperature to clean the DPF, for example.

In addition, operating the generator set for an extended time in a no load or a low load condition can also result in either wet stacking of the engine or higher than expected oil consumption, for example.

By using various techniques of this disclosure, the generator set can automatically add an auxiliary or supplemental electrical load during no load, low load, or low ambient temperature conditions to improve the engine efficiency and thermal management capability of after treatment components, such as a DPF. As described in more detail below, a control system can monitor one or more parameters of an engine and, in response to a parameter exceeding a threshold, turn on a jacket water heater in fluid combination with the engine in order to supplement the electrical load.

Figure 2:
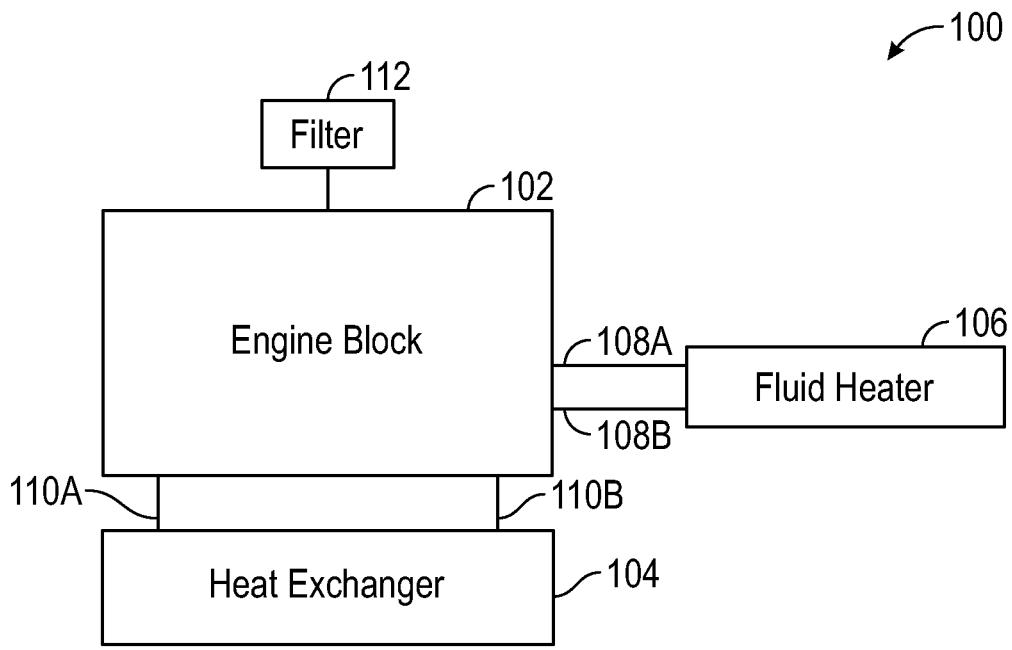
FIG. 2 is a block diagram of an example of an engine heating system that can be used to implement various techniques of this disclosure.

FIG. 2 is a block diagram of an example of an engine heating system that can be used to implement various techniques of this disclosure. The engine heating system 100 can be in fluid communication, e.g., such as using coolant, with an engine block 102 of an engine, such as the prime mover 12 of FIG. 1.

The engine heating system 100 can include a heat exchanger 104 and an electric fluid heater 106, such as an electric jacket water heater. In other examples, the fluid heater 106 can be an oil heater. In some examples, the fluid heater 106 can be a fuel heater or a Diesel Exhaust Fluid (DEF) heater. In the example shown in FIG. 2, the fluid heater 106 is disposed outside the engine block 102 and in fluid communication with the engine block 102 using hoses 108A, and 108B. In addition, the heat exchanger 104 can be in fluid communication, e.g., such as using coolant, with the engine block 102 using hoses 110A, and 110B.

As seen in FIG. 2, the engine block can be coupled to a filter 112, such as a DPF that can help remove particulate or soot from the exhaust of a diesel engine. Over time, the DPF can become clogged with accumulated material, which can be burned off using DPF regeneration techniques.

Figure 3:
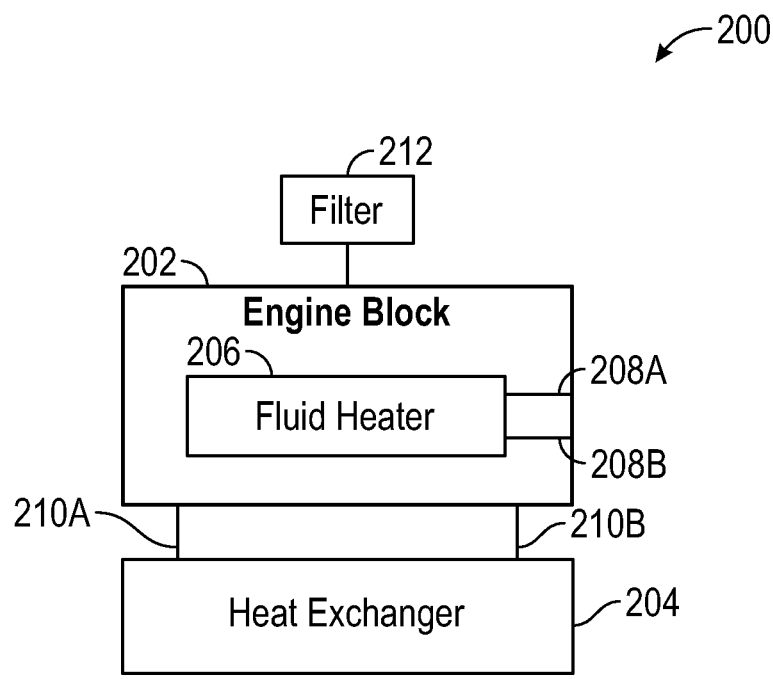
FIG. 3 is a block diagram of another example of an engine heating system that can be used to implement various techniques of this disclosure.

FIG. 3 is a block diagram of another example of an engine heating system that can be used to implement various techniques of this disclosure. The engine heating system 200 can be in fluid communication, e.g., such as using coolant, with an engine block 202 of an engine, such as the prime mover 12 of FIG. 1.

The engine heating system 200 can include a heat exchanger 204 and an electric fluid heater 206, such as an electric jacket water heater. In the example shown in FIG. 2, the electric fluid heater 206 is disposed inside the engine block 202 and in fluid communication with the engine block 202 using hoses 208A, and 208B. In addition, the heat exchanger 204 can be in fluid communication, e.g., such as using coolant, with the engine block 202 using hoses 210A, and 210B.

As seen in FIG. 3, the engine block can be coupled to a filter 212, such as a DPF that can help remove particulate or soot from the exhaust of a diesel engine. Over time, the DPF can become clogged with accumulated material, which can be burned off using DPF regeneration techniques.

Figure 4:
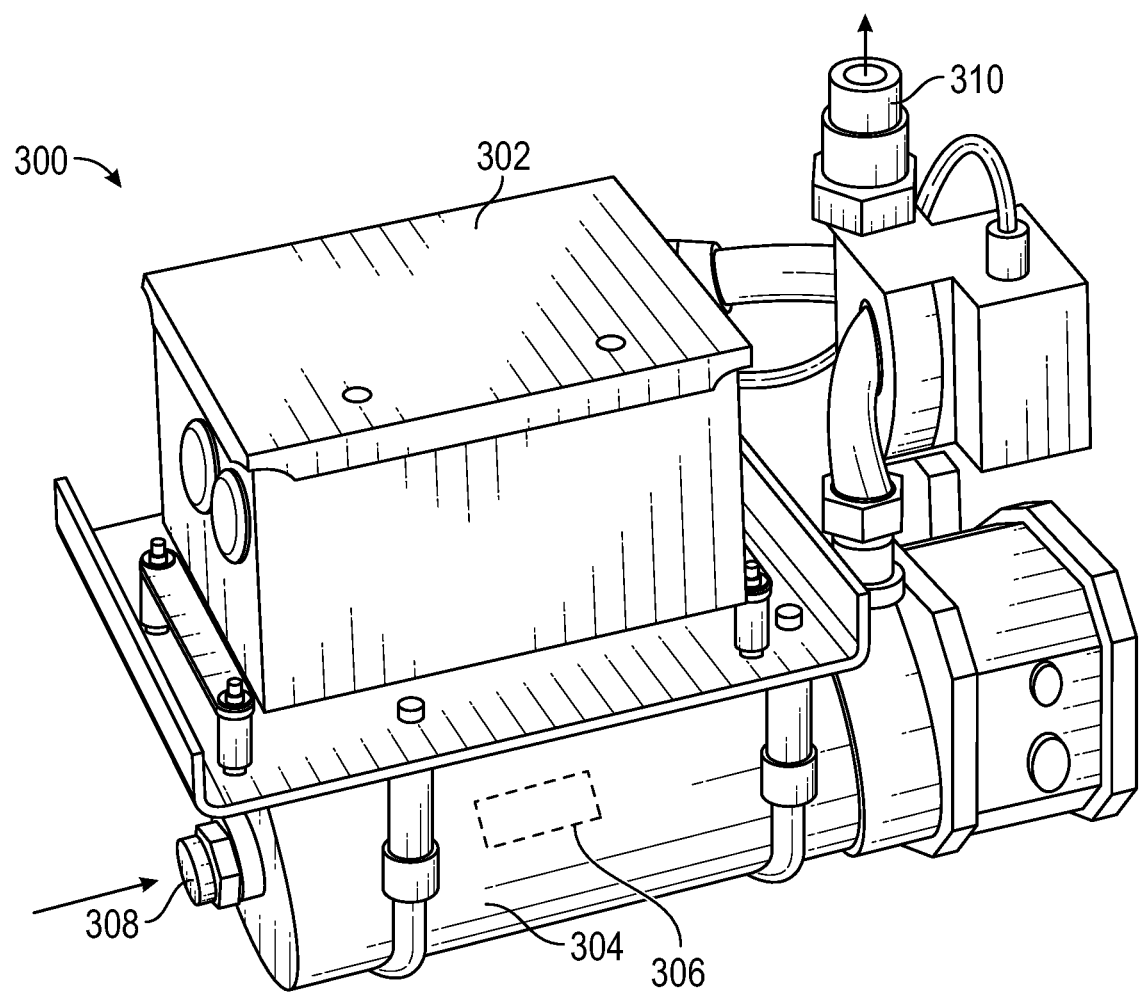
FIG. 4 is a perspective view of an example of a jacket water heater that can be used to implement various techniques of this disclosure.

FIG. 4 is a perspective view of an example of a jacket water heater that can be used to implement various techniques of this disclosure. The jacket water heater 300 can be an example of the fluid heater 106 of FIG. 2 and the fluid heater 206 of FIG. 3. The jacket water heater 300 can be an electric jacket water heater that is powered by a generator set, such as the generator set 10 of FIG. 1. The jacket water heater 300 can further include a control system 302, and a tank 304.

The tank 304 can include a heating element, a thermostat, and engine coolant. The engine coolant can include jacket water. The tank 304 can include die cast aluminum and a rubber insulating sleeve.

The control system 302 can have a terminal strip and a contactor. The control system 302 can be operable to receive power from a power source, control the on/off state of a resistive load 306, which can act as a heating element, located in the tank 304 by allowing or restricting power, control the heating element based on set a temperature point measured by the thermostat disposed in the tank 304, and control the on/off state of a pump by allowing or restricting power. Using various techniques of this disclosure and as described in more detail below, the control system can 302 utilize the resistive load 306 to supplement the external electrical load The heating element can be used to increase the temperature of nearby engine coolant via conduction. The thermostat can be disposed proximate to the heater inlet 308. The control system 302 can be operable to open and close a contactor that controls the heating element to be in the on or off state depending on the detected incoming engine coolant temperature from the thermostat.

The pump can be disposed proximate to the heater outlet 310. In other words, the pump can be disposed between the heater inlet 308 and heater outlet 310. The pump can be operable to pull the engine coolant through the jacket water heater 300. The pump can force the flow and circulation of the engine's coolant through the engine block, such as the engine block 102 of FIG. 2 and the engine block 202 of FIG. 3, via jacket water passages as part of the engine coolant circuit. The pump can operate continuously independent of the thermostat and heating element.

The heater outlet 310 can be located proximate to top of the jacket water heater 300 and be in fluid communication with the pump. The heater inlet 308 can be located proximate to the bottom of the jacket water heater 300 and can be in fluid communication with the tank 304.

Figure 5:
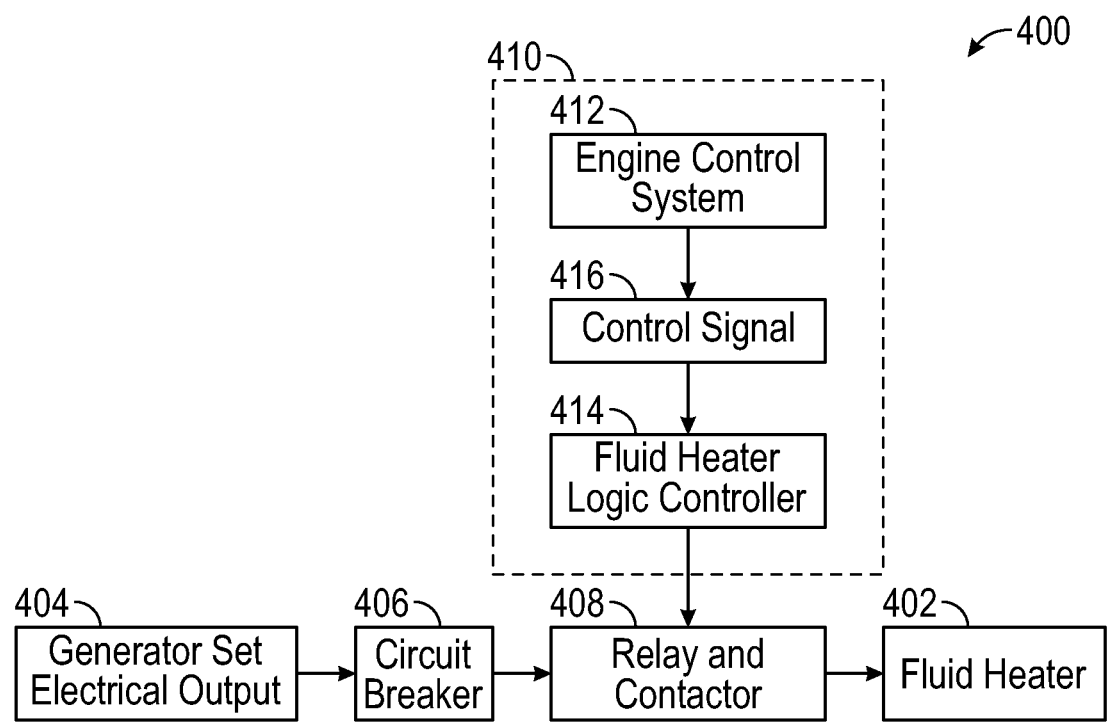
FIG. 5 is a block diagram of an example of a generator set that can implement various techniques of this disclosure.

FIG. 5 is a block diagram of an example of a generator set 400 that can implement various techniques of this disclosure. The generator set 400 can include an electric fluid heater 402, such as the jacket water heater 300 of FIG. 4. The electric fluid heater 402 can include a resistive load to supplement an external electrical load coupled to the generator set 400, such as the external electrical load 20 of FIG. 1.

The electric fluid heater 402 can receive electrical power via a generator set electrical output 404, such as the electrical bus 22 of FIG. 1. In FIG. 5, the electrical output 404 can be coupled to the electric fluid heater 402 via a circuit breaker 406 and a relay and contactor 408. The electrical output 404 can be powered using a single-phase voltage (L-N, L-L) or a three-phase voltage.

The generator set 400 can include a control system 410. The control system 410 can include an engine control system 412, such as having a first microcontroller, and a fluid heater logic controller 414, such as having a second microcontroller. The control system 410, e.g., the engine control system 412, can monitor a first parameter of the engine of the generator set and generate a first control signal in response to the parameter being less than a first threshold. For example, the engine control system 412 can monitor a parameter such as a representation of an output current supplied to the generator set electrical output 404, such as the electrical bus 22 of FIG. 1. Additionally, or alternatively, the engine control system 412 can monitor a parameter such as a representation of fuel consumption of the engine of the generator set, such as a rate of fuel consumption. Additionally, or alternatively, the engine control system 412 can monitor a parameter such as a representation of a soot level in a filter, such as the filter 112 in FIG. 2 or the filter 212 in FIG. 3.

The control system 410, e.g., the engine control system 412, to generate a first control signal 416, e.g., a load addition signal, in response to the first parameter being less than a first threshold. By way of a non-limiting example, the engine control system 412 can monitor the representation of an output current supplied to the generator set electrical output 404 and if the engine control system 412 determines that the output current is less than a threshold output current, the engine control system 412 can generate a first control signal ("load addition signal") to add a supplemental electrical load, namely the resistive load of the electric fluid heater 402. In some examples, the engine control system 412 can use a Controller Area Network (CAN bus) to transmit the first control signal to the fluid heater logic controller 414.

To add the supplemental electric load, the fluid heater logic controller 414 can turn on the electric fluid heater 402 in response to receiving the first control signal. For example, the fluid heater logic controller 414 can receive the first control signal and, in response, energize a coil of the relay and contactor 408 to close a relay contact to turn on the electric fluid heater 402. As described above, the electric fluid heater 402 can include a resistive load, such as the heating element 307 of FIG. 4, that is configured to supplement the external electrical load, such the external electrical load 20 of FIG. 1. By turning on the electric fluid heater 402 in response to the first control signal, the control system 410 can increase the external electrical load.

To turn off the electric fluid heater 402, the control system 410, e.g., the engine control system 412, can monitor a second parameter of the engine of the generator set and generate a second control signal in response to the parameter being less than a second threshold. In some examples, the second parameter can be the same as the first parameter used to turn on the electric fluid heater 402. In other examples, the second parameter can be different from the first parameter used to turn on the electric fluid heater 402. The second parameter can be a representation of an output current supplied to the generator set electrical output 404, such as the electrical bus 22 of FIG. 1, a representation of fuel consumption of the engine of the generator set, and/or a representation of a soot level in a filter, such as the filter 112 in FIG. 2 or the filter 212 in FIG. 3. The control system 410, e.g., the engine control system 412, to generate a second control signal 416, e.g., a load addition signal, in response to the second parameter exceeding a second threshold.

To remove the supplemental electric load, the fluid heater logic controller 414 can turn off the electric fluid heater 402 in response to receiving the second control signal. For example, the fluid heater logic controller 414 can receive the second control signal and, in response, de-energize the coil of the relay and contactor 408 to open a relay contact to turn off the electric fluid heater 402. In this manner, the control system 410 can turn off the electric fluid heater 402 in response to the second control signal and thereby remove the supplemental electric load.

Figure 6:
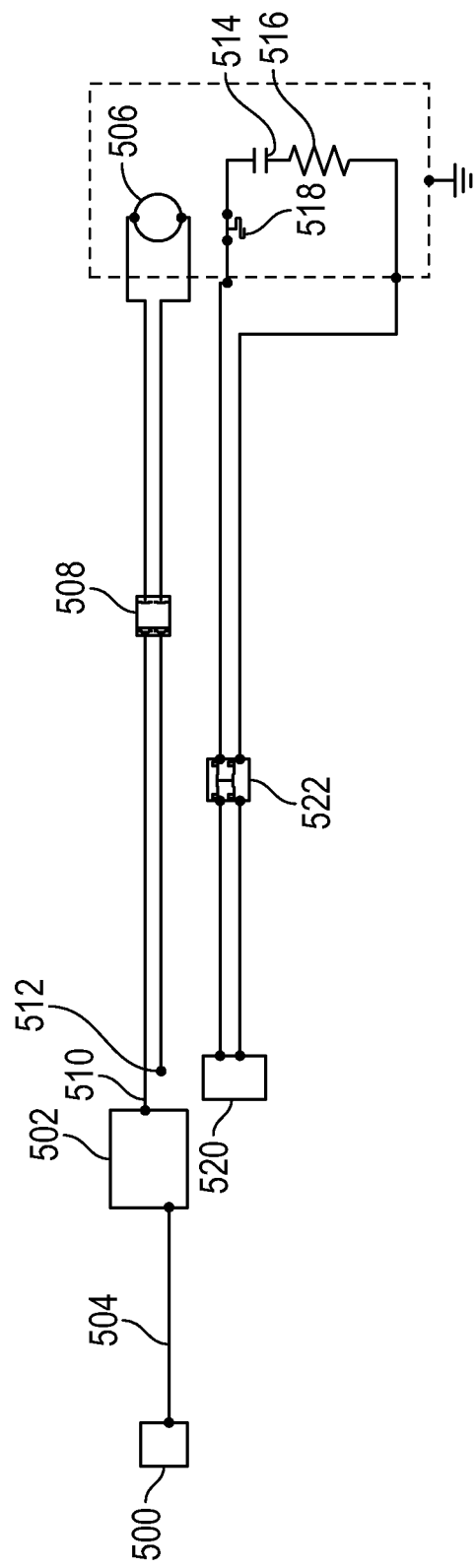
FIG. 6 is a schematic diagram of an example of a generator set that can implement various techniques of this disclosure.

FIG. 6 is a schematic diagram of an example of a generator set that can implement various techniques of this disclosure. An engine control module (ECM) 500 can be coupled to an electronic modular control panel (EMCP) 502, such as by using a CAN bus 504. The EMCP 502 can be coupled to a relay coil 506 of a relay, such as by a connector 508.

In some examples, the ECM 500 can monitor a first parameter and generate a first control signal in response to the parameter being less than a first threshold, such as described above with respect to FIG. 5. The ECM 500 can transmit the first control signal, such as over the CAN bus 504, to the EMCP 502. In response, the EMCP 502 can energize the relay coil 506 by coupling a voltage across the coil, such as 24V between node 510 and node 512, which can be coupled to a terminal block for example. In response, the relay coil 506 can close a normally open contact 514, which can be coupled to the resistive load 516 of the electric jacket water heater.

The control system can further include a normally closed thermal switch 518 coupled to the resistive load 516. The thermal switch 518 can be a protection feature and configured to open and disconnect the jacket water heater in response to a temperature exceeding a safe-operating threshold. For example, the thermal switch 518 can be configured to only open when temperatures exceed 100 degrees Celsius or higher. That is, the thermal switch 518 can open above a thermostat-opening temperature. This approach is in contrast to other designs in which the jacket water heater is disconnected before a thermostat of the engine-coolant system triggers.

The resistive load 516 of the jacket water heater can receive electrical power via a generator set electrical output 520, such as the electrical bus 22 of FIG. 1. In FIG. 6, the electrical output 520 can be coupled to the resistive load 516 by a circuit breaker 522.

Figure 7:
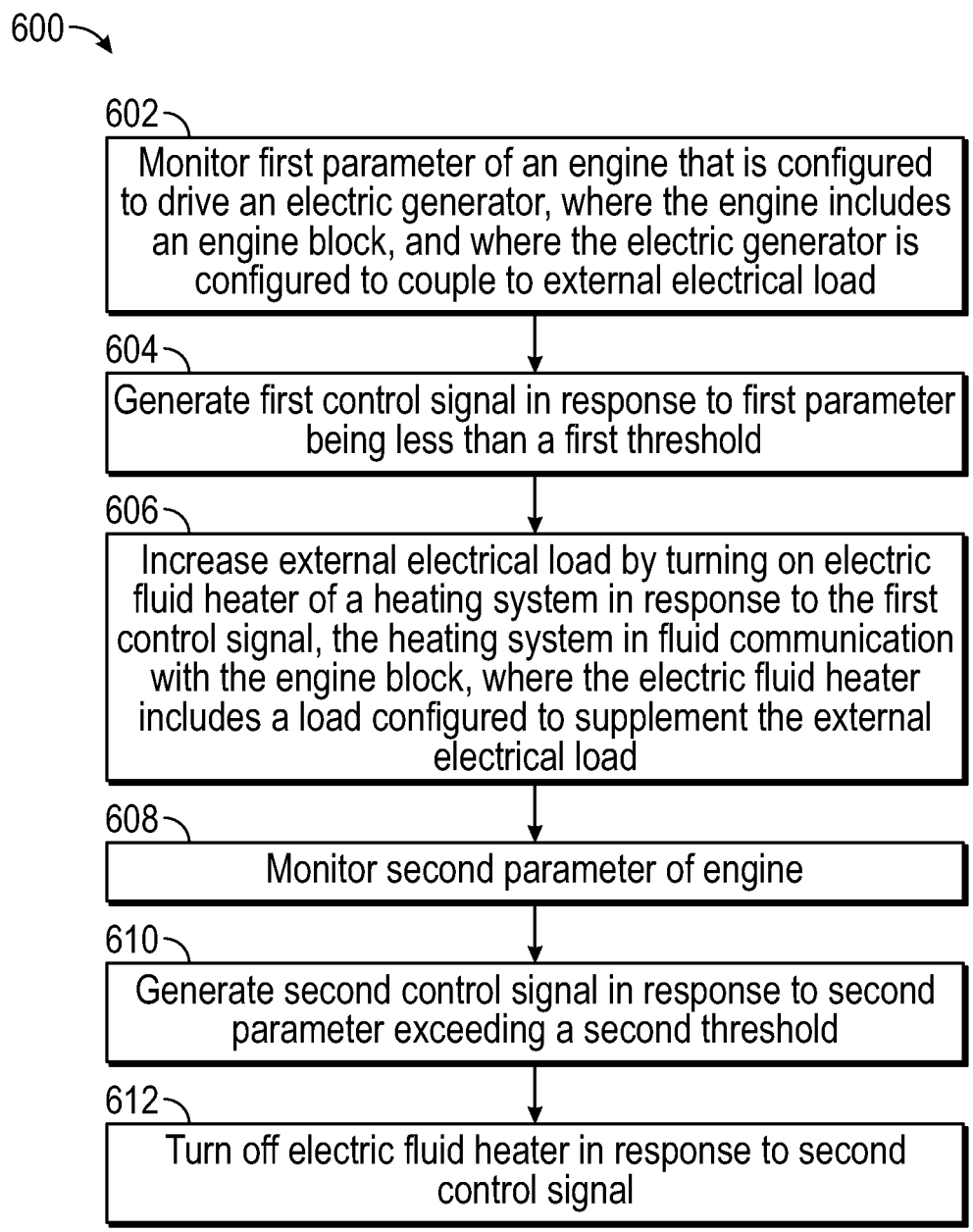
FIG. 7 is a flow diagram of an example of a method of operating a generator set to provide an electrical output to an external electrical load.

FIG. 7 is a flow diagram of an example of a method 600 of operating a generator set to provide an electrical output to an external electrical load. At block 602, the method 600 can include monitoring a first parameter of an engine that is configured to drive an electric generator, where the engine includes an engine block, and wherein the electric generator is configured to couple to the external electrical load. At block 604, the method 600 can include generating a first control signal in response to the first parameter being less than a first threshold. At block 606, the method can include increasing the external electrical load by turning on an electric jacket water heater of a heating system in response to the first control signal, the heating system in fluid communication with the engine block, wherein the electric jacket water heater includes a resistive load configured to supplement the external electrical load The method 600 can optionally further include blocks 608-612. At block 608, the method 600 can optionally include monitoring a second parameter of the engine. At block 610, the method 600 can optionally include generating a second control signal in response to the second parameter exceeding a second threshold. At block 612, the method 600 can optionally include turning off the electric heater in response to the second control signal.

INDUSTRIAL APPLICABILITY

Currently, generator set engines are designed to be operated under loaded conditions. If the generator set engine is not operated with sufficient mechanical load, then some of its components can be unfavorably affected. Operating the generator set for an extended time in a no load or a low load condition can result in either wet stacking of the engine or higher than expected oil consumption, for example. Further, if the generator set engine is equipped with emissions aftertreatment system, various components can lose efficiency or malfunction.

This disclosure pertains to a generator set-engine load management system. The system can add an electrical load during low load conditions for generator set applications to improve the engine efficiency and thermal management capability of after treatment components. For example, an electrical load, such as an electric jacket water heater (JWH).

The above detailed description is intended to be illustrative, and not restrictive. The scope of the disclosure should, therefore, be determined with references to the appended claims, along with the full scope of equivalents to which such claims are entitled.

What is claimed is:

1. A generator set configured to provide an electrical output to an external electrical load, the generator set comprising:
   an electric generator configured to couple to the external electrical load;
   an engine configured to drive the electric generator, the engine including an engine block;
   a heating system in fluid communication with the engine block, the heating system including an electric fluid heater, wherein the electric fluid heater includes a resistive load configured to supplement the external electrical load; and
   a control system for:
      monitoring a first parameter of the engine;
      generating a first control signal in response to the first parameter being less than a first threshold;
      increasing the external electrical load by turning on the electric fluid heater in response to the first control signal;
      monitoring a second parameter of the engine;
      generating a second control signal in response to the second parameter exceeding a second threshold; and
      turning off the electric heater in response to the second control signal.

2. The generator set of claim 1, wherein the control system includes:
   a relay having a relay coil and a contact, the contact coupled to the resistive load; and
   a controller having an output coupled to the relay, the controller for:
      receiving the first control signal; and
      in response to the first control signal, energizing the relay coil to close the contact and couple the resistive load to the electrical output of the generator set.

3. The generator set of claim 1, wherein the first parameter is the same as the second parameter.

4. The generator set of claim 1, wherein the first parameter and the second parameter are different.

5. The generator set of claim 1, wherein the control system includes a normally closed thermal switch coupled to the resistive load.

6. The generator set of claim 1, wherein the electric fluid heater is disposed inside the engine block.

7. The generator set of claim 1, wherein the electric fluid heater includes an electric jacket water heater.

8. The generator set of claim 1, wherein the first parameter includes a representation of an output current.

9. The generator set of claim 1, wherein the first parameter includes a representation of fuel consumption.

10. The generator set of claim 1, wherein the first parameter includes a representation of a soot level in a filter.

11. A method of operating a generator set to provide an electrical output to an external electrical load, the method comprising:
   monitoring a first parameter of an engine that is configured to drive an electric generator, wherein the engine includes an engine block, and wherein the electric generator is configured to couple to the external electrical load;
   generating a first control signal in response to the first parameter being less than a first threshold;
   increasing the external electrical load by turning on an electric fluid heater of a heating system in response to the first control signal, the heating system in fluid communication with the engine block, wherein the electric fluid heater includes a resistive load configured to supplement the external electrical load;

monitoring a second parameter of the engine;
generating a second control signal in response to the second parameter exceeding a second threshold; and
turning off the electric fluid heater in response to the second control signal.

12. The method of claim 11, wherein the first parameter is the same as the second parameter.

13. The method of claim 11, comprising:
receiving the first control signal; and
in response to the first control signal, energizing a relay coil to couple the resistive load to the electrical output of the generator set.

14. The method of claim 11, wherein the electric fluid heater includes an electric jacket water heater.

15. The method of claim 11, wherein the first parameter and the second parameter are different.

16. A generator set configured to provide an electrical output to an external electrical load, the generator set comprising:
an electric generator configured to couple to the external electrical load;
an engine configured to drive an electric generator, the engine including an engine block;
a heating system in fluid communication with the engine block, the heating system including an electric jacket water heater disposed within the engine block, wherein the electric jacket water heater includes a resistive load configured to supplement the external electrical load; and
a control system for:
monitoring a first parameter of the engine;
generating a first control signal in response to the first parameter being less than a first threshold;
increasing the external electrical load by turning on the electric heater in response to the first control signal;
monitoring a second parameter of the engine;
generating a second control signal in response to the second parameter exceeding a second threshold; and
turning off the electric jacket water heater in response to the second control signal.

17. The generator set of claim 16, wherein the first parameter is the same as the second parameter.

18. The generator set of claim 16, wherein the first parameter and the second parameter are different.

19. The generator set of claim 16, wherein the first parameter includes a representation of an output current or a representation of fuel consumption.

20. The generator set of claim 16, wherein the first parameter includes a representation from a group consisting of the output current, the fuel consumption, and soot level in a filter.

* * * * *